2,815,350

METHOD OF PREPARING ORGANIC DITHIO-PHOSPHORIC ACID COMPOUNDS

Rhoads M. Speck, New Castle, Del., assignor to Hercules Powder Company, Wilmington, Del., a corporation of Delaware No Drawing. Application August 30, 1955,
Serial No. 531,609

17 Claims. (Cl. 260—327)

This invention relates to an improved method of preparation of organic dithiophosphate compounds.

It is known to react O,O-dialkyl dithiophosphoric acids with organic halogen compounds in order to effect a substitution of the halogen by the O,O-dialkyl dithiophosphoric acid radical. Moreover, it is known to carry out a similar substitution using a molecular amount of a metal salt of the O,O-dialkyl dithiophosphoric acid in place of the acid alone. The latter method has been preferred to the former because of greater rate of reaction even though it is economically disadvantageous to use a salt.

In accordance with the present invention, it has now been found that the rate of reaction between O,O-dialkyl dithiophosphoric acids and chloro-organic compounds wherein a chlorine is replaced by an O,O-dialkyl dithiophosphoric acid radical is greatly accelerated by carrying out the reaction in the presence of a catalytic amount of a chloride of one of the following metals: zinc, iron and tin.

The metal chloride catalyst may be added directly as the metal chloride or it may be produced in situ by the reaction of elementary metal or metal salts other than the chloride with the hydrogen chloride set free in the reaction. The metal chloride is believed to be converted to the metal salt of the dialkyl dithiophosphoric acid which in turn reacts with the organic chlorine compound and is thus regenerated. The metal chloride is thus believed to be only an intermediate which is regenerated and is formed in situ initially from many organic and inorganic metal salts and is accordingly a catalyst within the classical definition of the term.

The process of this invention is more particularly set forth in the following examples in which all parts and percentages are by weight.

Examples

A mixture of 15.7 parts (0.1 mole) 2,3-dichloro-p-dioxane, 37.2 parts (0.2 mole) O,O-diethyl dithiophosphoric acid and 0.14 part (0.001 mole) zinc chloride (powdered) was stirred at about 70–80° C. while passing a slow current of nitrogen gas through the mixture to carry off the liberated hydrogen chloride. The rate was determined by measuring the amount of hydrogen chloride evolved per unit time. Using no catalyst the rate was, at most, 3% per hour. The rates (% per hour) with various catalysts were as follows: $ZnCl_2$ (0.14 part), 65%; $ZnCl_2$ (0.014 part), 20%; $FeCl_3$ (0.13 part), 100%; $SnCl_2$ (0.19 part), 25%.

Comparable increases in rate of reactivity between the chloro-organic compound and the O,O-dialkyl dithiophosphoric acid were shown by the following chloro-organic compounds which are illustrative but not limiting as to the scope of the invention: 2,5-dichloro-p-dioxane, 2,3-dichloro-p-dithiane, 2,3-dichloro-p-thioxane, 1,2-dichlorodiethyl ether, tetrachloro-p-dioxane, tetrachlorotetrahydropyran, 1,2-dichlorotetrahydropyran, p-chlorobenzyl chloride, chloroacetone, 4,5-dichloro-m-dioxolane, and α-chloro-m-dioxane.

The products of these examples may be used without further purification as insecticides. However, they were purified by washing the reaction mixture with water, with sufficient aqueous sodium hydroxide to neutralize the acids present and with fresh water. They were finally dried over sodium sulfate to remove water and the benzene was distilled off. In some instances the water was distilled off along with the benzene. The products showed by analysis that at least one halogen was replaced by the O,O-dialkyl phosphorodithioate group in each instance. In the case of 2,5-dichloro-p-dioxane, 2,3-dichloro-p-dithiane, 2,3-dichloro-p-thioxane, and 4,5-dichloro-m-dioxolane, two chlorine atoms are replaced by O,O-diethyl phosphorodithioate groups. In the case of p-chlorobenzyl chloride, chloroacetone, and α-chloro-m-dioxane, a mono(O,O-diethyl phosphorodithioate) resulted. The use of an excess of O,O-diethyl dithiophosphoric acid effected in the reaction with 2,3,3,5- and 2,3,3,6-tetrachloro-p-dioxane substitution of only one chlorine in the molecule, and with tetrachlorotetrahydropyran substitution of only two of the four chlorine atoms in the molecule. These results indicate substantially the same degree of substitution as is effected without a catalyst but using pyridine as the sequestering agent for the hydrogen chloride liberated in the reaction.

The process is in general applicable to all chloro-organic compounds in which the chlorine is sufficiently active to be replaced in the reaction with O,O-dialkyl dithiophosphoric acid or its salts without relying on the use of the catalyst of this invention. These catalysts accelerate rather than initiate the reaction and do not effect reaction of otherwise inert chlorine atoms. Thus, when using the catalysts of this invention, only the more active chlorine atoms are replaced. Organic chloro compounds which are operable and are of particular interest are those in which the replaceable chlorine atoms are on carbon atoms attached to oxygen or sulfur by a single bond as in ethers and thio ethers because of the excellent insecticidal properties of the products.

All of the O,O-dialkyl dithiophosphoric acids in which the alkyl groups are those having 1–4 carbon atoms are particularly interesting in the process of the present invention because of the utility of the resulting products as insecticides. However, there is no criticalness with respect to the present process in so far as the alkyl groups themselves are concerned and the invention is not limited with respect thereto.

The catalysts which are used in the present process are chlorides of zinc, iron and tin. Zinc and tin chlorides are preferred because they give the lightest colored products. While the catalysts are referred to as chlorides, it is to be understood that metals or salts which under the reaction conditions are converted into the metal chlorides may be used as equivalents because of the nature of the reaction, and it is not intended that the process should be limited to one in which the metal chloride is added as such to the reaction mixture.

The amount of catalyst used in the process of the present invention is not critical. A catalytic amount will generally be in the range of about 0.001 to 10 mole percent based on the organic chloride reactant, with about 0.01 to about 0.1 mole percent being preferred.

The reaction temperature is any temperature in the range of about 40 to about 200° C. at which reaction takes place but below the decomposition temperature of the product or any intermediate produced in the process. The particular temperature used will thus depend on the reactants used. Some intermediates such as the monochlorodioxanethiol S-O,O-dialkyl phosphorodithioate produced from dichloro-p-dioxane and O,O-dialkyl dithiophosphoric acid, for instance, are unstable at temperatures above about 110° C. and require temperatures lower than might otherwise be required. Likewise, some products are unstable at elevated temperatures, and for this reason call for a preferred upper temperature limit of about 110° C.

The reaction is preferably carried out in a solvent which is inert in the reaction, although solvents are not necessary. When a solvent is used, aromatic volatile hydrocarbons such as benzene, toluene, xylenes or cymene are preferred because they have the desired dissolving power for the reaction mixture without high dissolving power for the hydrogen chloride produced. Water is generally excluded from the reaction mixture because of its rendering the reaction mixture nonhomogeneous. However, traces of water do not need to be excluded and completely anhydrous catalysts are not necessary, except when the cholor-organic compound is exceptionally easily reactive with water as in the case of acid chlorides.

What I claim and desire to protect by Letters Patent is:

1. In the process defined by the reaction:

in which R is a lower alkyl radical and R'Cl is an organic chloride which reaction proceeds without a catalyst, the improvement which comprises effecting said reaction in the presence of a catalytic amount in the range of 0.001 to 10 mole percent based on the organic chloride of a metal chloride of the group consisting of zinc chloride, ferrous chloride and stannous chloride.

2. The method of claim 1 in which the metal chloride is zinc chloride.

3. The method of claim 1 in which the chloride of the metal is ferrous chloride.

4. The method of claim 1 in which the metal chloride is stannous chloride.

5. The method of accelerating the reaction of an O,O-dialkyl dithiophosphoric acid with a chlorodioxane, which comprises effecting said reaction in the presence of a catalytic amount of a chloride of a metal of the group consisting of zinc chloride, ferrous chloride and stannous chloride.

6. The method of claim 5 in which the chlorodioxane is a dichloro-p-dioxane.

7. The method of claim 5 in which the chlorodioxane is 2,3-dichloro-p-dioxane.

8. The method of claim 7 in which the metal chloride is zinc chloride.

9. The method of accelerating the reaction of an O,O-dialkyldithiophosphoric acid with a chlorodithiane, which comprises effecting said reaction in the presence of a catalytic amount of a chloride of a metal of the group consisting of zinc chloride, ferrous chloride and stannous chloride.

10. The method of claim 9 in which the chlorodithiane is a dichloro-p-dithiane.

11. The method of claim 10 in which the metal chloride is zinc chloride.

12. The method of accelerating the reaction of an O,O-dialkyldithiophosphoric acid with a chlorothioxane, which comprises effecting said reaction in the presence of a catalytic amount of a chloride of a metal of the group consisting of zinc chloride, ferrous chloride and stannous chloride.

13. The method of claim 12 in which the chlorothioxane is a dichloro-p-thioxane.

14. The method of claim 13 in which the metal chloride is zinc chloride.

15. The method of accelerating the reaction of an O,O-dialkyldithiophosphoric acid with a chlorotetrahydropyran which comprises effecting said reaction in the presence of a catalytic amount of a metal chloride of the group consisting of zinc chloride, ferrous chloride and stannous chloride.

16. The method of claim 15 in which the chlorotetrahydropyran is a polychlorotetrahydropyran.

17. The method of claim 16 in which the metal chloride is zinc chloride.

No references cited.